United States Patent
Gennesseaux (10) Patent No.: US 6,784,562 B2
(45) Date of Patent: Aug. 31, 2004

(54) HEAT ENGINE ELECTRICITY GENERATING SYSTEM HAVING LOW-PRESSURE ENCLOSURE FOR FLYWHEEL, CLUTCH AND ELECTRIC GENERATOR

(75) Inventor: André René Georges Gennesseaux, Conie-Molitard (FR)

(73) Assignee: Energiestro, Conie-Molitard (FR)

( * ) Notice: Subject to any disclaimer, the term of this patent is extended or adjusted under 35 U.S.C. 154(b) by 58 days.

(21) Appl. No.: 09/959,199

(22) PCT Filed: Feb. 23, 2001

(86) PCT No.: PCT/FR01/00538

§ 371 (c)(1),
(2), (4) Date: Oct. 17, 2001

(87) PCT Pub. No.: WO01/63729

PCT Pub. Date: Aug. 30, 2001

(65) Prior Publication Data

US 2002/0158530 A1 Oct. 31, 2002

(30) Foreign Application Priority Data

Feb. 23, 2000 (FR) .............................. 00 2286

(51) Int. Cl.$^7$ ............................ B60L 1/02; F01K 15/00; F01K 17/02; F02C 6/00; F02C 6/18
(52) U.S. Cl. ............................ 290/2; 290/4 R; 290/45; 322/4
(58) Field of Search .............................. 290/2, 4 R, 45; 322/4; 74/572, 573 R, 573 F; 310/74

(56) References Cited

U.S. PATENT DOCUMENTS

| 2,130,606 A | | 9/1938 | Wanamaker .................... 257/3 |
| 3,558,901 A | * | 1/1971 | Jacobus ..................... 290/30 R |
| 3,609,426 A | * | 9/1971 | Gaul ............................. 322/4 |
| 3,672,244 A | * | 6/1972 | Nasvytis ....................... 477/37 |
| 3,769,796 A | * | 11/1973 | Bechtold ....................... 60/227 |
| 3,886,810 A | | 6/1975 | Sugiyama et al. ............. 74/751 |
| 3,944,837 A | | 3/1976 | Meyers et al. ............ 290/40 R |

(List continued on next page.)

FOREIGN PATENT DOCUMENTS

| DE | 2511598 A1 | 9/1976 |
| DE | 2946074 A1 | 5/1981 |
| DE | 3929317 A1 | 3/1991 |
| DE | 4030134 A1 | 3/1992 |
| EP | 0668651 A1 | 8/1995 |
| GB | 1 514 577 | 6/1978 |
| WO | WO 99/27631 | 6/1999 |

OTHER PUBLICATIONS

"Flywheels", Post, R.F., et al., *Scientific American*, vol. 229, No. 6, Dec. 1973, pp. 17–23.
"Design Principles for a Flywheel Energy Store for Road Vehicles", Acarnley, P.P. et al., *Record of the Industry Applications Conference*, vol. 30, Oct. 8, 1995, pp. 672–678 (New York, U.S.A).

*Primary Examiner*—Nicholas Ponomarenko
*Assistant Examiner*—Pedro J. Cuevas
(74) *Attorney, Agent, or Firm*—Flynn, Thiel, Boutell & Tanis, P.C.

(57) ABSTRACT

Autonomous system for generating electricity comprising energy storage through an inertial flywheel. This system includes an engine/generator assembly having a heat engine, a mechanical speed variator, a clutch, a flywheel and a generator. The assembly composed of the clutch, the flywheel and the generator is placed in an evacuated enclosure so as to reduce energy losses. This system is intended to be installed directly in the buildings where the energy is used, such as for example, in detached houses. The system makes it possible to dispense with a link to the electrical economical in use than the systems of the same type which are already known.

25 Claims, 5 Drawing Sheets

U.S. PATENT DOCUMENTS

| | | | | |
|---|---|---|---|---|
| 4,022,174 A | * | 5/1977 | Brinkman | 123/448 |
| 4,098,144 A | * | 7/1978 | Besel et al. | 74/661 |
| 4,150,300 A | | 4/1979 | Van Winkle | 290/2 |
| 4,282,772 A | * | 8/1981 | Franch | 475/14 |
| 4,303,843 A | * | 12/1981 | Arnoux et al. | 310/67 R |
| 4,307,629 A | * | 12/1981 | Moller | 475/255 |
| 4,309,620 A | * | 1/1982 | Bock | 290/4 R |
| 4,325,338 A | * | 4/1982 | Fujiwara et al. | 123/406.67 |
| 4,411,171 A | * | 10/1983 | Fiala | 475/5 |
| 4,439,720 A | * | 3/1984 | Georges | 322/4 |
| 4,444,444 A | | 4/1984 | Benedetti et al. | 308/10 |
| 4,460,834 A | * | 7/1984 | Gottfried | 307/64 |
| 4,473,753 A | * | 9/1984 | Izumi et al. | 290/45 |
| 4,495,451 A | * | 1/1985 | Barnard | 318/150 |
| 4,525,661 A | * | 6/1985 | Mucsy et al. | 322/4 |
| 4,572,141 A | * | 2/1986 | Hasegawa et al. | 123/339.22 |
| 4,588,040 A | * | 5/1986 | Albright et al. | 180/165 |
| 4,592,208 A | * | 6/1986 | Sollner et al. | 62/323.1 |
| 4,606,193 A | * | 8/1986 | Molina | 60/698 |
| 4,612,494 A | * | 9/1986 | Kawamura | 322/4 |
| 4,965,998 A | * | 10/1990 | Estigoy et al. | 60/325 |
| 5,345,154 A | * | 9/1994 | King | 318/49 |
| 5,462,402 A | * | 10/1995 | Bakholdin et al. | 415/90 |
| 5,519,275 A | * | 5/1996 | Scott et al. | 310/112 |
| 5,614,777 A | | 3/1997 | Bitterly et al. | 310/74 |
| 5,664,534 A | * | 9/1997 | Schmitz | 123/192.1 |
| 5,760,508 A | | 6/1998 | Jennings et al. | 310/74 |
| 5,767,595 A | | 6/1998 | Rosen | 310/74 |
| 5,834,835 A | * | 11/1998 | Maekawa | 257/680 |
| 5,834,853 A | * | 11/1998 | Ruiz et al. | 290/54 |
| 5,880,544 A | * | 3/1999 | Ikeda et al. | 310/74 |
| 5,969,446 A | * | 10/1999 | Eisenhaure et al. | 310/74 |
| 6,049,150 A | * | 4/2000 | Chudleigh, Jr. | 310/74 |
| 6,144,128 A | * | 11/2000 | Rosen | 310/74 |
| 6,175,172 B1 | * | 1/2001 | Bakholdin et al. | 310/74 |
| 6,262,505 B1 | * | 7/2001 | Hockney et al. | 310/90.5 |
| 6,347,925 B1 | * | 2/2002 | Woodard et al. | 417/51 |
| 6,476,529 B1 | * | 11/2002 | Tilbor | 310/74 |
| 6,514,777 B2 | * | 2/2003 | Brown et al. | 438/15 |
| 6,573,626 B1 | * | 6/2003 | Gosebruch et al. | 310/74 |
| 6,585,490 B1 | * | 7/2003 | Gabrys et al. | 417/51 |

* cited by examiner

HEAT ENGINE ELECTRICITY GENERATING SYSTEM HAVING LOW-PRESSURE ENCLOSURE FOR FLYWHEEL, CLUTCH AND ELECTRIC GENERATOR

The present invention relates to an autonomous system for generating electricity, intended to be installed directly in the buildings where the energy is used, such as for example detached houses. It can make it possible to dispense with a link to the electrical network, to create less pollution and to be more economical in use than the systems of the same type which are already known, especially (but not exclusively) if it is used in cogeneration mode.

Cogeneration systems are intended to produce electricity and heat simultaneously. They have both an economic and ecological benefit, since they make it possible to save energy and to limit the emissions of carbon dioxide which generates a greenhouse effect. They allow autonomous energy production, precisely where networks are not accessible.

However, cogeneration is used especially on a large scale, in units of several hundred kilowatts which are more adapted to industry or to dense housing. When the housing becomes less dense, and particularly in respect of detached houses, the benefit of centralized cogeneration of high power diminishes, since an expensive heat distribution network has to be constructed, giving rise to considerable energy losses. It would be much more beneficial to install the cogeneration system in the building where the energy is used. Numerous inventors have therefore devised cogeneration systems for small buildings, such as detached houses. The basic idea, consisting of using an electric generating set while recovering the heat of the heat engine in order to heat the building and the sanitary water, is described for example in patent U.S. Pat. No. 2,130,606. However, this simple system is not satisfactory. At the end user, the demand for electricity fluctuates greatly, with a maximum demand which is much greater than the average demand, and long periods of very low demand. The electric generating set must be dimensioned to provide the maximum electrical power, but it usually operates at very low load, this giving rise to very poor efficiency and premature wear. This system is not therefore used in practice.

U.S. Pat. No. 3,944,837 proposes that this drawback be alleviated by connecting the cogeneration system to the public electrical network, in order to smooth the electricity demand. The electric generating set provides the average power continuously, and the network furnishes the difference between the average power and the instantaneous power. The company Senertec, in Germany, is proposing a cogeneration system based on a similar principle. However, this technique requires on the one hand that the network be accessible, thereby losing the advantage of autonomy, and on the other hand that the operator of the network purchase electricity under good conditions, this not always being guaranteed.

U.S. Pat. No. 4,150,300 proposes that the electricity produced by the electric generating set be stored in electrochemical batteries. This solution currently represents the state of the art, since it affords numerous advantages relative to the previous solutions. It is found in particular on boats since the system is thus completely autonomous. The engine can rotate at its state of maximum efficiency long enough to charge the batteries, and stop completely between two charges. It can be dimensioned for an appreciably lower power than the maximum power. However, drawbacks still remain. The overall efficiency is fairly low on account of the poor storage efficiency of the batteries: of the order of 50% for lead batteries. Batteries have a lifetime limited to a few thousand charging and discharging cycles: they have to be renewed frequently, this being very expensive. Moreover, the batteries used for these applications contain heavy metals such as lead or cadmium: this is therefore a polluting solution.

Numerous patents, for example U.S. Pat. No. 4,444,444, propose that the electrochemical batteries be replaced by an inertial flywheel, also referred to as an electromechanical battery. The flywheel has the advantage over the battery of wearing out less rapidly, of being nonpolluting and of restoring the major part of the energy transmitted to it. To do this, the flywheel is placed in an evacuated enclosure so that the friction of the air at its periphery does not dissipate too much energy. Specifically, the peripheral speed of a storage flywheel is extremely high: of the order of 300 m/s for a steel flywheel, much more for a flywheel made of composite materials. The flywheel is then linked to the outside of the enclosure by a purely electrical link, the electric machine serving both as motor and as generator. This solution is beneficial if the electricity comes from the network, but for an autonomous system, it is not at all beneficial, since the mechanical energy of the heat engine must be converted into electrical energy before again being converted into mechanical energy bound for the flywheel, this giving rise to numerous losses.

Numerous patents, for example the document DE-A-40 30 134, propose that the flywheel be coupled mechanically to the heat engine, with the aid of a clutch, thereby eliminating the above problem. When the flywheel reaches its maximum speed, the clutch is opened, thereby enabling the motor to be stopped while leaving the flywheel and the electric generator rotating. This system has excellent storage efficiency, but still has drawbacks. In particular, the heat engine, coupled directly to the flywheel, must rotate at extremely variable duty regimes. The efficiency and the power of heat engines varying extremely greatly with the duty regime, the consequences of this are on the one hand that the efficiency is not very good and on the other hand that the motor must be overdimensioned in order to have enough power at the lowest duty regime.

Numerous patents relating to the transmissions of motor vehicles propose that this problem be solved by interposing between a heat engine and a storage flywheel a mechanical transmission allowing speed discrepancies: for example in the document U.S. Pat. No. 3,886,810, this transmission comprises a hydraulic torque converter, a mechanical speed variator and a clutch. This arrangement, which seems never to have been proposed for an electricity generating system, makes it possible to render the duty regime of the engine independent of the state of charge of the flywheel.

However, the above two patents suffer from a major drawback inherent to mechanical transmission between the flywheel and the engine: the flywheel rotates in the air, thereby bringing about very considerable losses which decrease the efficiency, hence the benefit of the system. It would certainly be possible to place the flywheel in an evacuated enclosure with a dynamic seal on the transmission shaft, but this seal would in turn give rise to undesirable friction, let alone the risks of failure linked with the wearing thereof, since it is invoked continuously.

OBJECTS AND SUMMARY OF THE INVENTION

An objective of the present invention is to solve all or some of these problems, by improving the known systems of the same type. These systems comprise a heat engine producing heat and mechanical power from a fuel, a flywheel for storing kinetic energy, a clutch between the heat engine and the flywheel and an electric generator coupled rigidly to the flywheel. The system according to the invention is essentially characterized in that the clutch, the flywheel and the electric generator are placed inside an enclosure where the pressure is appreciably lower than atmospheric pressure.

In preferred embodiments of the invention, recourse may moreover be had to one and/or to the other of the following arrangements:

the clutch is controlled by electromagnet;

a power transmission member is placed between the heat engine and the clutch;

the power transmission member comprises at least one element chosen from: a hydraulic coupler, a hydraulic torque converter, a step-down gear, a step-up gear, a mechanical speed variator;

the power transmission member is a mechanical speed variator controlled in such a way that the heat engine rotates at a substantially constant duty regime during operation thereof;

the mechanical speed variator comprises a plate driven by the motor and an idler driving the flywheel, the power being transmitted from the plate to the idler by friction, it being possible for the idler to be moved on the plate in such a way as to modify the transmission ratio;

the mechanical speed variator is of the type with trapezoidal belt and variable-diameter pulleys;

the mechanical speed variator is of the toroidal type.

Recourse may also be had to one and/or to the other of the following arrangements, which may possibly be used independently of the other arrangements described in the present patent application:

the system furthermore comprises a heat-bearing fluid circuit adapted to cool at least one element chosen from: the heat engine, the power transmission member, the electric generator, at least one bearing supporting the flywheel: the heat-bearing fluid circuit thus recovers the heat dissipated by all or some of these elements;

the heat-bearing fluid circuit comprises a heat exchanger adapted to cool exhaust gases emitted by the heat engine by heat exchange with the heat-bearing fluid circuit, thereby recovering the heat of these exhaust gases;

the system furthermore comprises a burner adapted to produce heat from the fuel, the heat exchanger being adapted to at least partially transfer this heat to the heat-bearing fluid circuit;

the system furthermore comprising a fan adapted to blow air across the heat exchanger so as to cool the heat-bearing fluid.

Recourse may also be had to one and/or to the other of the following arrangements, which may possibly be used independently of the other arrangements described in the present patent application:

the heat engine is of a type chosen from: a controlled-ignition internal-combustion piston engine, a spontaneous-ignition internal-combustion piston engine (diesel), an external-combustion piston engine (Stirling), a gas turbine;

the heat engine is of the internal-combustion piston type and comprises a longer expansion stroke than the compression stroke (Miller cycle).

Recourse may also be had to one and/or to the other of the following arrangements, which may possibly be independently of the other arrangements described in the present patent application:

the electric generator is a synchronous generator comprising a permanent-magnet rotor;

the electric generator is a homopolar generator, comprising a rotor made of a ferromagnetic material and a stator comprising on the one hand, a first coil making it possible to create a substantially constant magnetic flux in the rotor, and on the other hand, a plurality of second coils whose flux varies periodically with the rotation of the rotor, thus inducing the alternating output voltage;

a part of the flywheel serves the electric generator as magnetic circuit.

Recourse may also be had to one and/or to the other of the following arrangements, which may possibly be used independently of the other arrangements described in the present patent application:

the flywheel exhibits a shape chosen from the following list: a torus of substantially rectangular cross section, a side of the rectangle being oriented parallel to the axis of rotation, a solid disc of substantially constant thickness;

the flywheel is monoblock, axisymmetric, and it has a thickness that exhibits two bulges, respectively at the center and at the periphery, and an intermediate narrowing between said bulges;

the generator comprises a rotor fixed on one of the two bulges of the flywheel and a stator disposed opposite the narrowing of the flywheel;

the flywheel is made of steel;

the axial cylindrical surface or surfaces of the flywheel are prestressed by shot-peening;

the outer axial cylindrical surface of the flywheel is prestressed by fibers wound under tension;

the fibers wound under tension are made of a material chosen from the following list: glass, carbon, aramid.

Recourse may also be had to one and/or to the other of the following arrangements, which may possibly be used independently of the other arrangements described in the present patent application:

the flywheel is fixed elastically to its hub;

the flywheel comprises fixing tabs extending radially inward, the hub comprises arms extending radially outward, and the tabs are linked to the arms by blocks of elastic material.

Recourse may also be had to one and/or to the other of the following arrangements, which may possibly be used independently of the other arrangements described in the present patent application:

the heat engine and the flywheel each rotate about a horizontal axis;

the heat engine and the flywheel each rotate about a vertical axis;

the heat engine rotates about a horizontal axis and the flywheel rotates about a vertical axis;

the flywheel rotates about a vertical axis and is and is situated entirely in a dish made in a rigid base supporting the engine and the generator;

the flywheel is installed in a cavity under the level of the ground so as to hold back any eruption in the event of bursting.

Other characteristics and advantages of the invention will become apparent in the course of the following description of several embodiments thereof, which are given by way of nonlimiting examples, in conjunction with the appended drawings.

DETAILED DESCRIPTION

Figure 1:
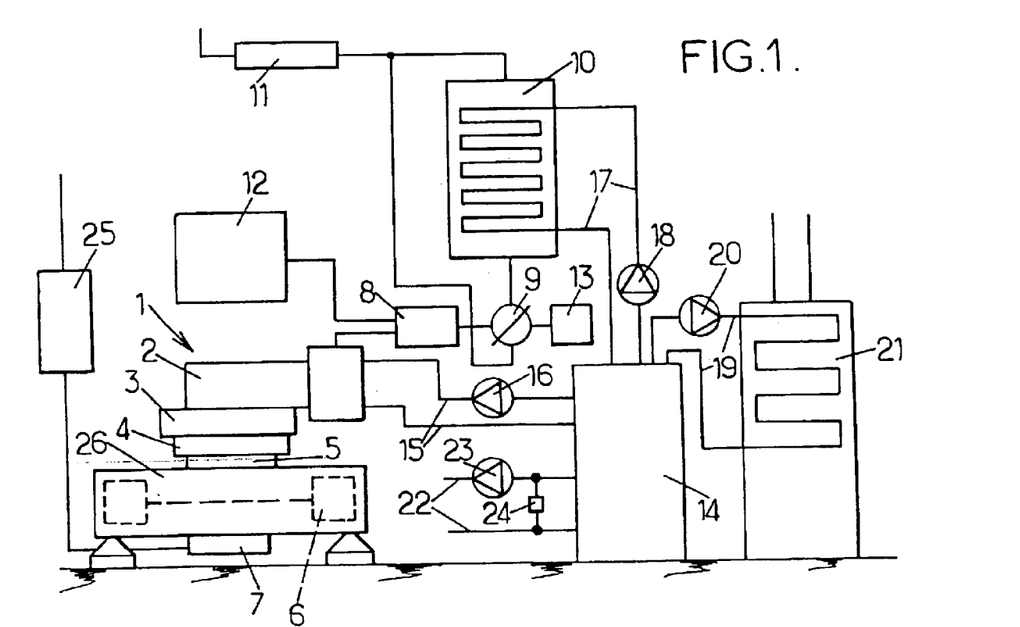
FIG. 1 represents a diagrammatic view of an exemplary embodiment of the system according to the invention, utilized according to the principle of cogeneration.

The invention will now be described in a preferred, but nonlimiting, embodiment with the aid of the drawings. FIG. 1 represents a diagrammatic view of the electricity generation system according to the invention, utilized according to the principle of cogeneration. It comprises an engine/generator assembly 1 consisting of a heat engine 2, of a torque converter 3 whose input shaft is coupled to the output shaft of the engine 2, of a step-up gear 4 whose input shaft is coupled to the output shaft of the torque converter 3, of a clutch 5, of an inertial flywheel 6 contained in an evacuated enclosure 26 and having a shaft linked to the output shaft of the step-up gear 4 by way of the clutch 5, and of a generator 7 adapted for transforming the kinetic energy of the flywheel 6 into electrical energy. The detailed manner of operation of the engine/generator assembly 1 will be described hereinbelow with FIG. 2.

The exhaust gases from the heat engine 2 pass through a catalyst and/or a particle filter 8 which rids them of the most polluting substances, and are then routed by a gate 9 either to a heat exchanger 10 upstream of an exhaust silencer 11, or directly to the exhaust silencer 11. A burner 12 makes it possible to produce heat without invoking the heat engine 2. The output of the burner is linked directly to the exhaust of the heat engine 2 so as to benefit from the same catalyst 8, from the same heat exchanger 10 and from the same silencer 11. A fan 13 makes it possible, when the gate 9 is turned in such a way as to send the escape gases directly to the silencer, to blow air into the exchanger so as to remove heat and cool the system.

A tank 14 provided with thermal insulation constitutes a heat reservoir containing a certain amount of heat-bearing fluid, which may be of the same type as the coolant liquid for motor vehicles, that is to say a mixture of water, glycols and various additives. To increase the heat capacity of the tank 14 without overly increasing its volume and without the temperature of the heat-bearing fluid undergoing overly large fluctuations, it is possible to place therein a substance undergoing a solid/liquid phase change at a temperature of the order of 90° C.

From the tank 14, various circuits, each comprising a pipe for the outward run and a pipe for the return run, convey the heat-bearing liquid to various members with which it can exchange heat. The first circuit 15, which goes to the heat engine 2, and is set moving by the circulating pump 16, makes it possible to recover heat by cooling the motor. The second circuit 17, which goes to the heat exchanger 10 with the aid of the circulating pump 18, makes it possible to recover the heat of the exhaust gases. The third circuit 19 goes with the aid of the circulating pump 20 to the domestic hot water tank 21 in order to heat it up. The fourth circuit 22 goes with the aid of the circulating pump 23 to the radiators (or other means of heating) of the residence so as to heat them. Provision may be made, in a conventional manner, for a thermostatic mixing valve 24 on the circuit 22 so as to prevent the radiators from becoming too hot.

Generally, provision may be made for heat-bearing liquid circuits to all the elements of the system which are liable to dissipate heat, so as to cool them while increasing the energy efficiency of the system: for example the generator 7 or the bearings of the flywheel 6. In the example of FIG. 1, there is represented a separate circulating pump 16, 18, 20, 23 for each circuit 15, 17, 19, 22, but it is quite obvious to a person skilled in the art that this number may be reduced for the sake of economy, and that a single pump can set all the circuits moving. However, in this case, provision must be made for adjusting means for altering the flow rate in each of the circuits, for example thermostatic valves. The various circuits can also be connected up in series, the fluid firstly cooling the least hot members, for example the generator 7, then the heat engine 2 and finally the heat exchanger 10.

The system according to the invention finally comprises a control and power unit 25 whose role is twofold. On the one hand, it controls the various elements of the system with the aid of an electronic computer (microcontroller) linked to sensors and to actuators (not represented). On the other hand, it reshapes the voltage provided by the generator 7 so as to deliver to the building a voltage similar to that of the public electricity network (for example 230 V at 50 Hz), since the generator 7, rotating at variable speed, cannot produce this voltage directly. These elements are sufficiently well known to persons skilled in the art for it not to be necessary to describe them in greater detail.

Figure 2:
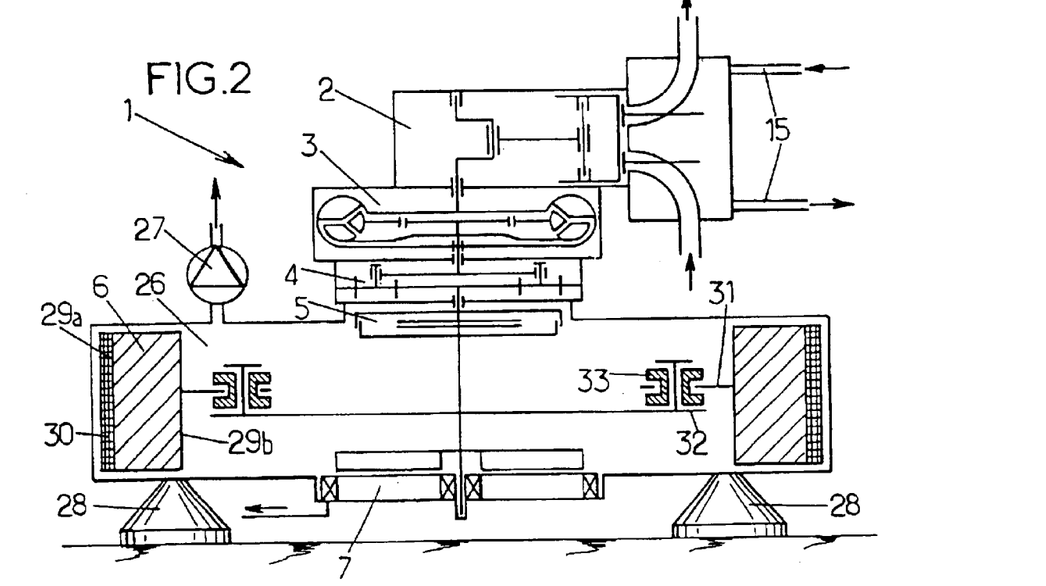
FIG. 2 represents a detailed diagrammatic view of the engine/generator assembly of the system of FIG. 1, for a first preferred embodiment.

With reference to FIG. 2, the engine/generator assembly 1 will now be described in detail in a first preferred, but nonlimiting embodiment. The heat engine 2 is of the diesel type. The advantages of this engine are its high efficiency, its low cost, its robustness and its capacity to use low-quality inexpensive fuels. In particular, this engine can operate with the domestic fuel oil used for heating residences, so that the system according to the invention is very easily installed when it is utilized according to the principle of cogeneration: it replaces an existing boiler while profiting from its infrastructure. To fix matters, a mechanical power of 5 to 10 kW, which is suitable for an average house, can be obtained with a small single-cylinder diesel engine of 0.3 to 0.6 l cubic capacity.

The diesel motor of the invention can be supplemented with a turbocompressor, which makes it possible to increase its efficiency and its specific power. Another lesser known but more inexpensive means of increasing the efficiency of a diesel engine is to use the Miller cycle, which consists in having a longer exhaust stroke than the intake stroke. In practice, to produce this cycle with the connecting rod/crank system, the cubic capacity of the engine is increased and the camshaft is modified so that the intake valve closes after the bottom dead center, while the piston is rising. The actual intake stroke is then only a fraction of the piston stroke, whereas the exhaust stroke is complete.

It is of course possible, depending on circumstances, to use other fuels and other types of engine: the fuel for motor vehicles is of little benefit by virtue of its price, but heavy oils, kerosene, biofuels or various gases (natural gas, liquefied petroleum gas, biogas, hydrogen, etc.) may be beneficial depending on the local economic context. Controlled-ignition engines are the most economical to purchase, whereas Stirling engines have theoretical advantages but are appreciably more expensive.

The gas turbine is probably the best choice for mass production, since although it is expensive to develop, it has decisive advantages: low production cost, reliability, and absence of vibrations.

The torque converter 3 is a well known component of motor vehicle transmissions. Its role is to transmit mechanical power between two rotary members rotating at speeds whose ratio is variable, and in particular when one of the members is stationary. A purely mechanical transmission such as a gearbox or an infinitely variable box fulfills the same function with better efficiency, but is much more expensive. The benefit of the torque converter 3 is to allow correct operation of the engine/generator assembly 1 with a minimum of means. When the system is initially switched on, the heat engine 2 is firstly started up, then the clutch 5 is actuated. The torque converter 3 then allows smooth starting of the flywheel 6. During the normal running of the system, the flywheel 6 rotates continuously while the heat engine 2 is stationary. When the speed of the flywheel 6 reaches its lower limit, the clutch 5 is actuated and the torque converter 3 then ensures smooth starting of the heat engine 2. Finally, during the phase of acceleration of the flywheel 6 by the heat engine 2, the torque converter 3 ensures through its slippage the matching of their different speeds, with acceptable efficiency.

The step-up gear 4 ensures matching of the speed of rotation of the heat engine 2 to that of the flywheel 6, since the torque converter cannot increase the output speed. To fix matters, a small diesel engine has maximum revs of around 3000 min$^{-1}$ (rpm), and a steel flywheel 0.6 m in diameter can rotate safely at around 9000 min$^{-1}$, this giving a step-up gear ratio of the order of 3. FIG. 2 represents an embodiment of the step-up gear 4 with the aid of an epicyclic train, but other embodiments are obviously possible: gearing, belt, chain, etc.

The clutch 5 makes it possible to disunite the flywheel 6 from the remainder of the rotating components, so as to be able to stop the heat engine 2 when the flywheel 6 does not need to be accelerated. The clutch is preferably one which is controlled by an electromagnet, in an embodiment where the coil is fixed so as to avoid the presence of brushes. In the clutch-disengaged position, there is no contact between the two plates, thereby guaranteeing an absence of friction and of wear.

The clutch 5, the flywheel 6 and the generator 7 are placed in the evacuated enclosure 26, since these members rotate at high speeds. In the air at atmospheric pressure, the losses by friction would be so high that the flywheel would very rapidly lose its energy. A vacuum pump 27 makes it possible to keep the pressure in the evacuated enclosure 26 low enough despite the inevitable admissions of gas: degassing of materials, leakage of seals, etc. This vacuum pump 27 can be driven by an electric motor associated with a pressure sensor, but it can also, more economically, be driven directly by the heat engine 2. The fact that the clutch 5 is situated inside the evacuated enclosure 26 is of the greatest importance: during the periods for which the heat engine 2 is stationary, that is to say most of the time, this arrangement makes it possible to fully eliminate the movements on the dynamic seals of the drive shaft of the clutch 5. In his way both the friction and the wearing of the seals are considerably reduced relative to the known solutions of the same type.

The flywheel 6 is preferably metallic. It is however known that a flywheel made of composite materials makes it possible to store more energy per unit mass than a metal flywheel, but in a fixed installation such as the latter, mass reduction is not a priority. On the contrary, since a flywheel made of composite materials is not very heavy, it must be rotated at extremely high peripheral speeds in order to store up the maximum energy. For example, for a flywheel made of glass fiber 0.6 m in diameter, it has to rotate at almost 30,000 min$^{-1}$, this being too high for a mechanical transmission. The metal flywheel is best adapted to the low speeds of rotation allowed by the mechanical transmission. Among metals, steel is the best choice on account of its very low cost, even for high-performance grades.

The optimal shape of a flywheel is not unique: it depends both on the stresses and on the optimization criterion. If a maximum speed of rotation and a maximum diameter are imposed, and if one seeks to minimize the mass of the flywheel for a given stored energy, two different optimal shapes can be found. For a low speed and small diameter (that is to say a low peripheral speed), the optimal shape is a torus, so that all the mass is at the maximum speed. In practice, the simplest shape to produce is a torus of rectangular cross section, one side of which is oriented parallel to the axis of rotation. The stresses can be made uniform by a slightly trapezoidal shape, where the thickness decreases as the radius increases, as shown diagrammatically in FIG. 6. If the peripheral speed is increased, the stress in the torus reaches the maximum stress allowable by the material, and the optimal shape becomes that represented in FIG. 7: a solid disc whose cross section exhibits two bulges, respectively at the center 39 and the periphery 40, and a narrowing 41, at an intermediate diameter between the center and the periphery.

It is possible to use special arrangements to increase the strength of the flywheel, which is subjected to very high stresses due to centrifugal force. A first arrangement consists of shot-peening the axial cylindrical surface or surfaces 29a, 29b in such a way as to create a compressive prestress which will be subtracted from the tensile stress due to the rotation. A second arrangement, which can be compounded with the first, consists in winding fibers 30 under tension around the outer axial cylindrical surface 29a of the flywheel 6, this also having the effect if creating a compressive prestress. These fibers 30 may for example be made of glass, carbon or aramid.

Since the flywheel 6 rotates at high speed, it must be carefully balanced so as not to produce vibrations. However, high-quality balancing is extremely expensive. An advantageous arrangement consists in mounting the flywheel 6 elastically on its hub. To do this the flywheel comprises fixing tabs 31 extending radially outward, and the tabs 31 are linked to the arms 32 by blocks of elastic material 33. At high speed, the flywheel rotates thus as if it where free, and the vibrations which it transmits to the spindle are minimal.

For the bearings of the flywheel 6, use is preferably made of ball bearings, which are adequate since only low speeds of rotation are involved. Other known technologies such as active or passive magnetic bearings are of higher performance, but they are not necessary here. It is moreover possible to improve the bearings by replacing the steel balls by ceramic balls which make it possible to limit the stresses due to centrifugal force at very high speeds of rotation.

The generator 7, coupled to the flywheel 6, has to be chosen from the numerous technologies available depending on the requirements of the application. Hence, a brushless generator will preferably be used, so as to avoid frictional losses and the servicing problems to which brushes give rise. It is in face beneficial to avoid any conductor on the rotor, since a conductor is prone to Joule-effect losses. Even though these losses are small in absolute value, they may lead to considerable heating of the rotor which rotates in vacuo and can therefore dissipate only very little heat to the outside. A known technology meeting these criteria is the synchronous generator having permanent magnets on the rotor. However, it is also possible to use a lesser known technology, the homopolar generator: this comprises a rotor composed solely of ferromagnetic material and a stator composed of two electrical circuits. A first coil makes it possible to create a substantially constant magnetic flux in the rotor; second coils are disposed around the rotor, in such a way that the flux which crosses them varies periodically with the rotation of the rotor, thus inducing the alternating output voltage. The advantage of this generator over that having permanent magnets is that the magnetization flux can be regulated as a function of the speed of rotation of the flywheel 6, this making it possible to obtain a substantially constant output voltage. In all cases, an advantageous arrangement when the flywheel 6 is made of steel consists in using a part of the flywheel 6 as the magnetic circuit of the electric generator 7.

Figure 7:
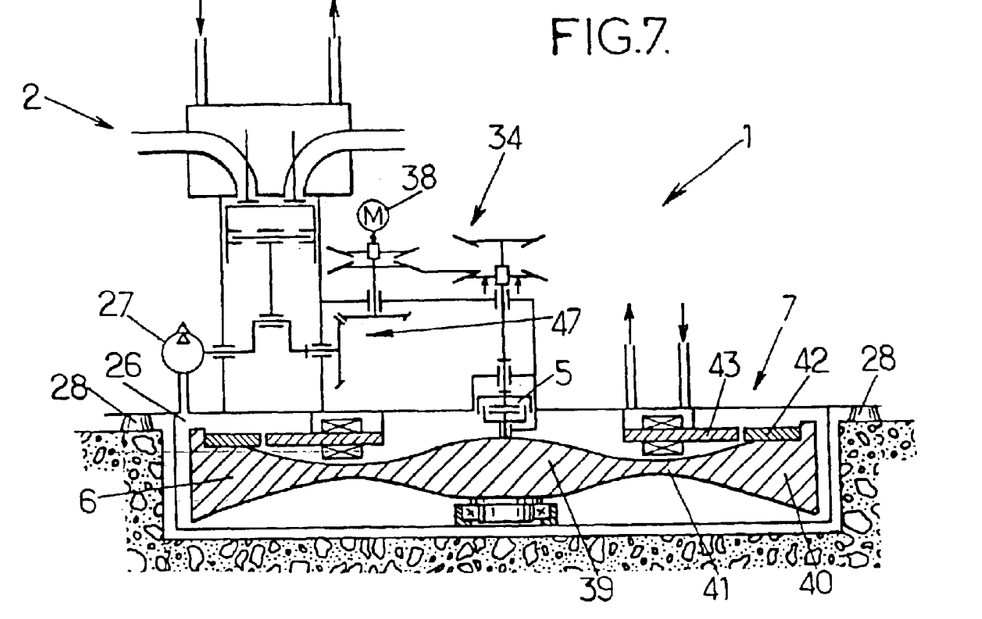
FIG. 7 represents a detailed diagrammatic view of the engine/generator assembly in the system of FIG. 1, for a third preferred embodiment.

FIG. 7 shows a preferred embodiment of the generator 7 when the flywheel 6 exhibits the above-described shape having two bulges 39, 40: the rotor 42 of the generator 7 is fixed on one of the two bulges 39, 40, and the stator 43 is placed level with the narrowing 41. The advantage of this embodiment is that the generator 7 is thus perfectly integrated into the flywheel 6: the rotor 42 is at a spot where fixing thereof is easy and where it is well supported by the structure of the flywheel 6; the stator 43 will be inserted into an available location, so that the flywheel/generator assembly 6, 7 has the same bulk as that of the flywheel 6 alone. These considerations are very important, since the already known solutions had numerous drawbacks: if the generator 7 is separate from the flywheel 6, the axial bulk becomes very considerable, and it is necessary to add bearings and a coupling; if the generator 7 is integrated into the periphery of the flywheel 6, the radial bulk becomes very large and the rotor 42 is subjected to an unacceptable centrifugal force; finally, if the generator 7 is integrated into the center of the flywheel 6, then the latter has to be drilled, thereby increasing the stress and hence requiring a heavier flywheel 6. Another interesting arrangement consists in producing a generator 7 and a control and power unit 25 which are reversible, that is to say which are capable of transmitting energy to the flywheel 6. Thus, if the system is linked up to other electricity generators, the flywheel 6 can serve to store the energy which they produce. This is particularly beneficial with renewable energy sources such as the sun and the wind, whose times of production are outside one's control.

Figure 9:
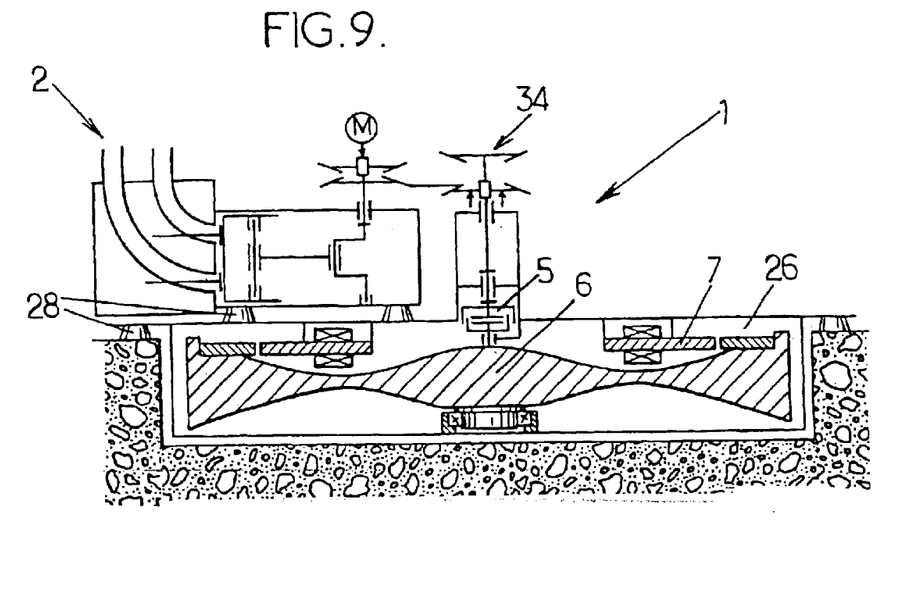
FIG. 9 represents a detailed diagrammatic view of the engine/generator assembly in the system of FIG. 1, for a fifth preferred embodiment.

The engine/generator assembly 1 is laid on antivibration supports 28 which isolate it from the ground. It is also possible to place antivibration supports 28 between the heat engine 2 and the remainder of the system, so as to protect the flywheel 6 from the vibrations of the engine, as represented in FIG. 9.

Figure 3:
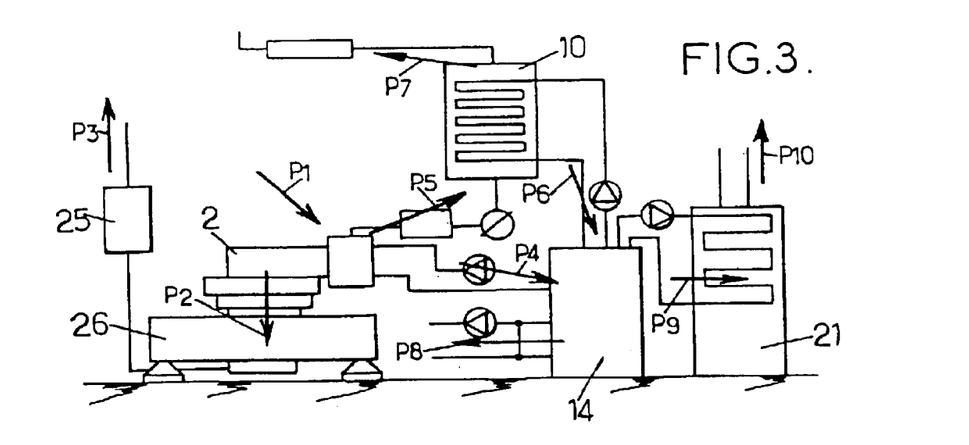
FIG. 3 represents energy fluxes in the system of FIG. 1, for normal operation of the system.
Figure 4:
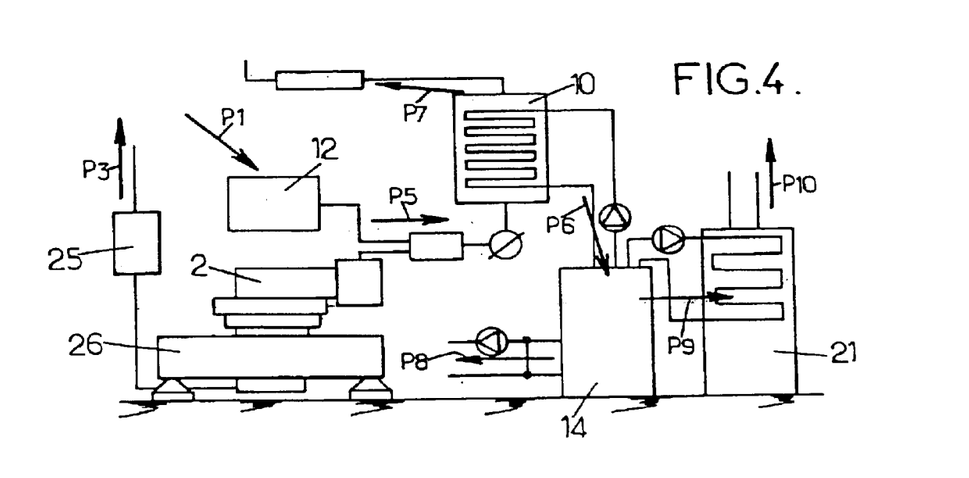
FIG. 4 represents the energy fluxes in the system of FIG. 1, in the case of high demand for heat.
Figure 5:
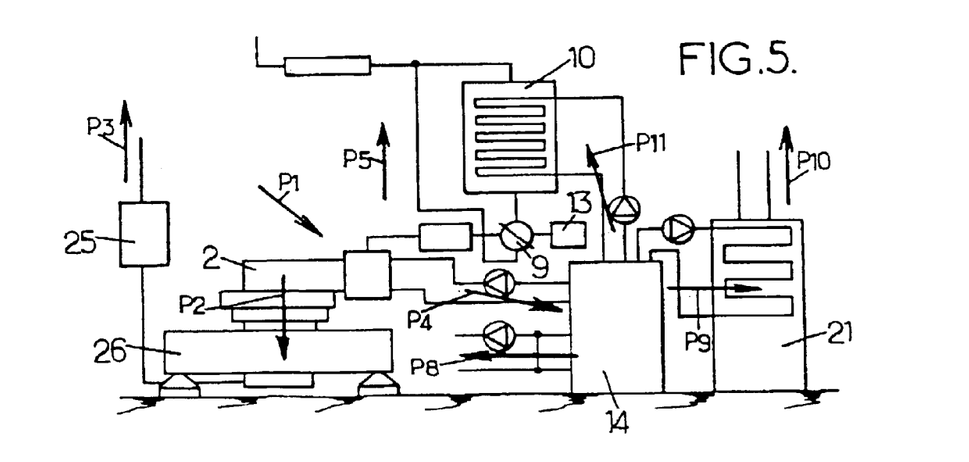
FIG. 5 represents the energy fluxes in the system of FIG. 1, in the case of high demand for electricity.

FIGS. 3, 4 and 5 represent the energy fluxes for the various cases of operation of the system. In these figures, the fluxes of the same type are designated in the same way. Only the members of the systems which are used in the relevant case of operation are represented.

FIG. 3 represents the energy fluxes for normal operation of the system. When the heat engine 2 is operating, a power P1 is injected into the system in the form of fuel. The heat engine 2 converts of the order of 40% of the power liberated by the fuel into mechanical power P2 serving to accelerate the flywheel 6. The latter stores kinetic energy, which the generator 7 and the control and power unit 25 use to produce electrical power P3. Around 30% of the power liberated by the fuel is lost in the engine in the form of heat and must be removed by the cooling circuit, in the form of thermal power P4 to the heat tank 14. Finally, around 30% of the power liberated by the fuel exits in the exhaust gases in the form of thermal power P5. A large part of this power is recovered by the heat exchanger 10, which sends thermal power P6 to the heat tank 14, a power P7 being definitively lost. This tank 14 contains thermal energy which serves to heat the building with the aid of radiators, with a thermal power P8, and to heat the domestic hot water tank 21, with a thermal power P9. The consumption of domestic hot water from the tank 21 represents a thermal power P10.

FIG. 4 represents the energy fluxes in the case of a high demand for heat. This situation occurs for example when the outside temperature is low, and should it be necessary to heat the building much more than the extent provided naturally by cogeneration. The heat engine 2 is then stopped and the burner 12 ignited. A large part of the thermal power produced P5 is recovered by the heat exchanger 10, which sends a thermal power P6 to the tank 14, a power P7 being definitively lost. The remainder is identical to the previous case. This arrangement has the advantage, relative to a separate boiler, of reusing the heat exchanger already present in the system, this being more economical and less bulky.

FIG. 5 represents the energy fluxes in the case of a high demand for electricity. This situation occurs for example when the outside temperature is high, and should an electric air-conditioner operate continuously to cool the building. Since the heat produced by the engine then becomes surplus, not only must its recovery be stopped, but it must be removed. The gate 9 is turned in such a way that the thermal power P5 contained in the exhaust gases from the heat engine 2 is sent directly to the outside. The heat engine 2 continues to be cooled by the heat-bearing liquid, the thermal power P4 being sent to the tank 14. The fan 13 blows air across the heat exchanger 10, which removes a thermal power P11 from the tank 14 to the outside. The remainder is identical to the previous case. This arrangement makes it possible to dispense with a radiator for cooling the heat engine 2, this being more economical and less bulky.

Figure 6:
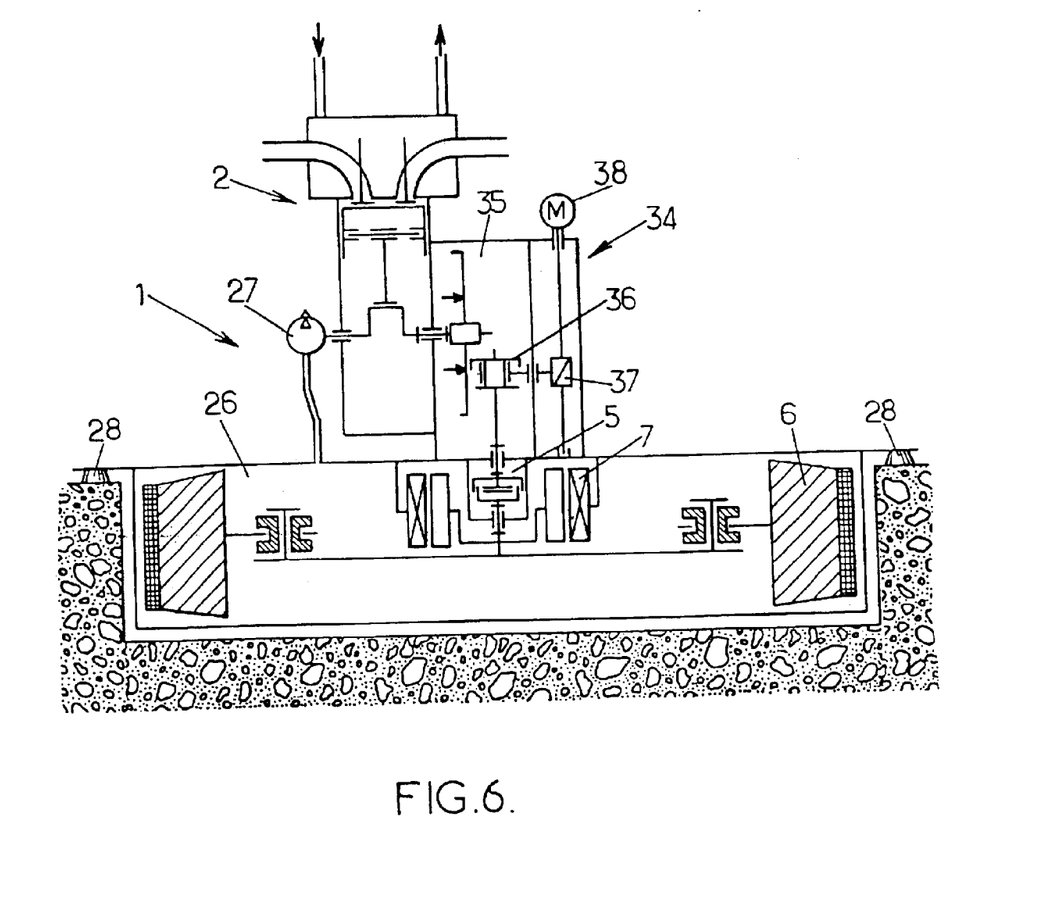
FIG. 6 represents a detailed diagrammatic view of the engine/generator assembly in the system of FIG. 1, for a second preferred embodiment.

FIG. 6 shows, by way of nonlimiting example, a second preferred embodiment of the invention, in which the transmission from the heat engine 2 to the flywheel 6 is effected by way of a mechanical speed variator 34. This mechanical speed variator 34 comprises a plate 35 driven by the heat engine 2 and mounted slidably on its shaft. This plate 35 is pressed against an idler 36 driving the flywheel 6 by way of the clutch 5. This idler 36 is itself mounted slidably on its shaft, and an adjusting system consisting for example of an electric motor 38 linked to a screw/nut system 37 makes it possible to move the idler 36 with respect to the plate 35, in such a way as to vary the transmission ratio. The power is transmitted by friction with good efficiency appreciably greater than that of a hydraulic member such as a torque converter 3. On the other hand, the phases of starting the flywheel 6 by the heat engine 2 and vice versa no longer benefit from the progressiveness of the torque converter 3. It is the job of the clutch 5 to cater to these phase through slippage thereof, provided that it is dimensioned accordingly. A beneficial arrangement is for the current in the clutch 5 to be controlled finely with the aid of the control and power unit 25 so as to effect clutching which is neither too fast, since this would give rise to considerable stresses, nor too slow, since this would give rise to considerable heating and considerable wear of the clutch 5. A hydraulic coupler can also be appended to the kinematic chain, provided that it is short-circuited during normal operation so as not to dissipate too much energy.

The benefit of the mechanical speed variator 34 is to allow the heat engine 2 to rotate at a constant duty regime during operation thereof, although the flywheel 6 is accelerating continuously. Indeed, for most heat engines, there is a duty regime of optimal efficiency where consumption is minimum. It is also makes it possible to render the starting phases easier: when it is the heat engine 2 which sets off the flywheel 6, the mechanical speed variator 34 is adjusted to its minimum ratio, the idler 36 near the center of the plate 35, whereas when it is the flywheel 6 which causes the heat engine 2 to start, the mechanical speed variator 34 is adjusted to its maximum ratio, the idler 36 at the periphery of the plate 35.

The flywheel 6 is placed advantageously in the base of the engine/generator assembly 1, since it constitutes the heavies member of the system. To fix matters, a flywheel which can store up an energy of 1 kW.h has a mass of around 100 kg if it is made of steel with a high elastic limit. In this case, the axis of rotation is vertical, the flywheel 6 rotating in a horizontal plane, this making it possible to lower its center of gravity to the maximum extent. A beneficial arrangement is represented in FIGS. 6, 7, 9 and 10: the flywheel 6 is half buried in the ground for safety reasons. In the event of rupture, the pieces are thus confined and do not run the risk of constituting a danger.

FIG. 7 represents a system according to the invention where the mechanical speed variator 34 is of the type with a trapezoidal belt and variable-diameter pulleys. This type of variator is very common and cheap, being as it is a standard component, which is not the case for the mechanical speed variator 34 of FIG. 6. However, since the most common heat engines 2 have a horizontal output, it is necessary to insert a right angle drive 47 with bevel gears into the kinematic chain.

Figure 8:
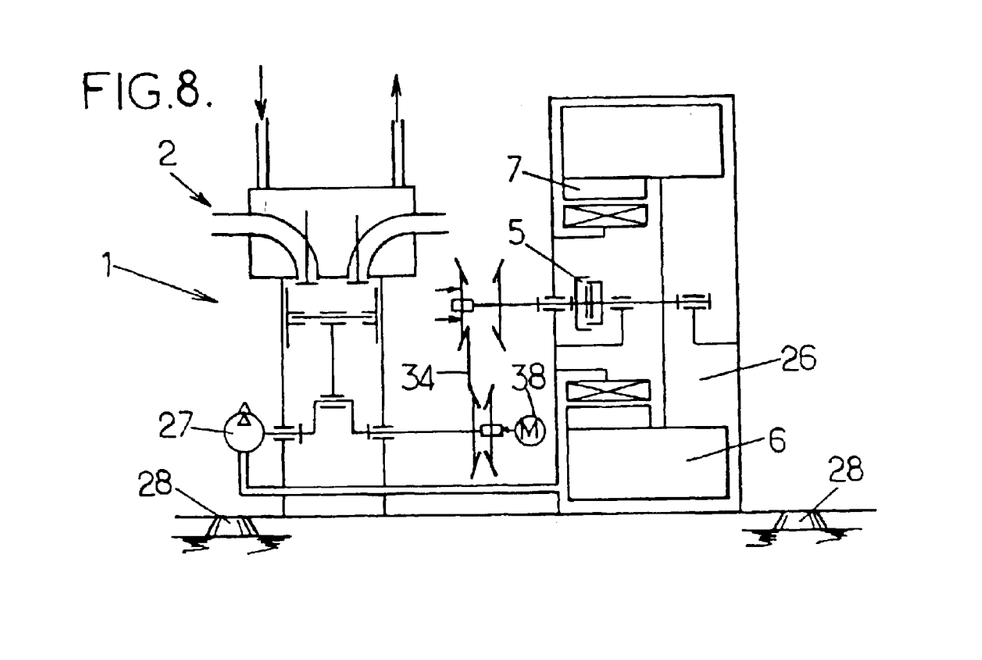
FIG. 8 represents a detailed diagrammatic view of the engine/generator assembly in the system of FIG. 1, for a fourth preferred embodiment.

FIG. 8 shows a very economical system, similar to that of FIG. 7 but with no right angle drive, where the flywheel 6 rotates about a horizontal axis.

FIG. 9 shows a system which is both economical and compact, since the heat engine 2 is on a vertical axis. A belt-type mechanical speed variator 34 is sufficient to link it to the flywheel 6, which likewise rotates about a vertical axis, this making it possible to place it optimally under the level of the ground.

Figure 10:
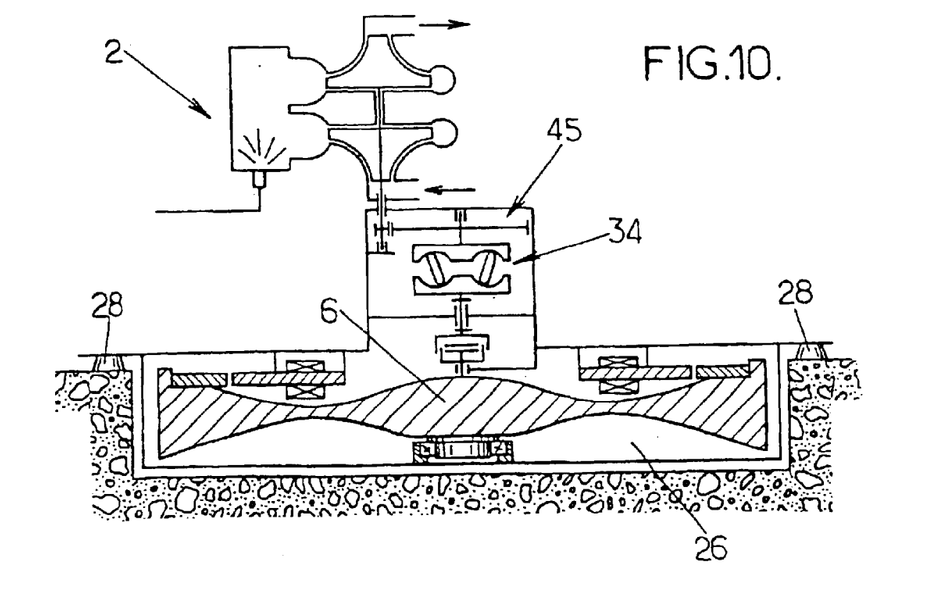
FIG. 10 represents a detailed diagrammatic view of the engine/generator assembly in the system of FIG. 1, for a sixth preferred embodiment.

Finally, FIG. 10 shows a system using a heat engine 2 of gas turbine type and a mechanical speed variator 34 of toroidal type. Since the heat engine 2 rotates at constant speed during operation thereof, it is possible to use the technology of the single-shaft turbine, which has the advantage of being simple and economical, in contrast to twin-shaft turbines. The speed of rotation of a gas turbine being much higher than that of a piston engine of the same power, a step-down gear must be used. The toroidal variator has the advantage of not comprising any wear-prone components such as belts, thus making it possible to reduce maintenance.

Pursuant to which, and irrespective of the embodiment adopted, an autonomous electricity generation system is ultimately obtained, intended to be installed directly in the buildings where the energy is used, such as for example detached houses. It makes it possible to dispense with a link to the electrical network, to create less pollution and to be more economical in use than the systems of the same type which are already known.

As goes without saying, the invention is in no way limited to those of its embodiments which have been more specially envisaged; on the contrary, it embraces all variants thereof.

What is claimed is:

1. A system for generating electricity comprising a heat engine producing heat and mechanical power from a fuel, a flywheel for storing kinetic energy, the flywheel defining a first bulge at a center thereof, a second bulge at a periphery thereof and an intermediate narrowing between the first and second bulges, a clutch between the heat engine and the flywheel and an electric generator coupled rigidly to the flywheel, wherein the clutch, the flywheel and the electric generator are placed inside an enclosure where the pressure is appreciably lower than atmospheric pressure.

2. The system as claimed in claim 1, in which the clutch is controlled by an electromagnet.

3. The system as claimed in claim 1, in which a power transmission member is placed between the heat engine and the clutch.

4. The system as claimed in claim 3, in which the power transmission member comprises at least one element chosen from: a hydraulic coupler; a hydraulic torque converter; a step-down gear; a step-up gear; and a mechanical speed variator.

5. The system as claimed in claim 4, in which the power transmission member is a mechanical speed variator controlled in such a way that the heat engine rotates at a substantially constant duty regime during operation thereof.

6. The system as claimed in claim 3, furthermore comprising a heat-bearing fluid circuit adapted to cool at least one element chosen from: the heat engine; the power transmission member; the electric generator; and at least one bearing supporting the flywheel.

7. The system as claimed in claim 6, in which the heat-bearing fluid circuit comprises a heat exchanger configured and disposed to cool exhaust gases emitted by the heat engine by heat exchange with the heat-bearing fluid circuit.

8. The system as claimed in claim 7, furthermore comprising a burner adapted to produce heat from the fuel, the heat exchanger being adapted to at least partially transfer this heat to the heat-bearing fluid circuit.

9. The system as claimed in claim 8, furthermore comprising a fan adapted to blow air across the heat exchanger so as to cool the heat-bearing fluid.

10. The system as claimed in claim 1, in which the electric generator is a synchronous generator comprising a permanent-magnet rotor.

11. The system as claimed in claim 1, in which the electric generator is a homopolar generator, comprising a rotor made of a ferromagnetic material and a stator comprising a first coil which creates a substantially constant magnetic flux in the rotor, and a plurality of coils whose flux varies periodically with the rotation of the rotor, to induce alternating output voltage.

12. The system as claimed in claim 10, in which a part of the flywheel defines, a magnetic circuit for the electric generator.

13. The system as claimed in claim 1, in which the flywheel comprises a solid disc.

14. The system as claimed in claim 1, in which the flywheel rotates about a vertical axis and is situated entirely in a dish defined in a rigid base supporting the engine and the generator.

15. The system as claimed in claim 14, in which the flywheel is installed under the level of the ground.

16. The system as claimed in claim 1, wherein the flywheel is monoblock and axisymmetric.

17. The system as claimed in claim 1, in which the generator comprises a rotor fixed on one of the first and second bulges of the flywheel and a stator disposed adjacent the narrowing of the flywheel.

18. The system as claimed in claim 1 wherein the flywheel is drivingly connected to the heat engine through the clutch, and the clutch selectively couples the flywheel and the engine with one another and selectively decouples the flywheel and the engine from one another.

19. A system for generating electricity in a building, said system comprising a heat engine which produces heat and mechanical power from a fuel, a flywheel for storing kinetic energy and being drivingly connected to said engine by a shaft structure, said flywheel defining a first bulge at a center thereof, a second bulge at a periphery thereof and an intermediate narrowing between the first and second bulges, an electric generator coupled to said flywheel for converting kinetic energy of said flywheel into electrical energy, and a clutch disposed between said flywheel and said engine which couples said flywheel and said engine to one another and decouples said flywheel and said engine from one another, and an enclosure having a pressure therein which is lower than atmospheric pressure, said clutch, said flywheel and said generator being disposed within said enclosure.

20. The system of claim 19 wherein said intermediate narrowing comprises an annular portion of said flywheel disposed between said first and second bulges, and said generator includes a rotor fixed on one of said first and second bulges and a stator mounted in said enclosure within a recess defined by said annular portion of said flywheel.

21. The system of claim 20 wherein said flywheel is mounted within said enclosure for rotation about a vertical axis.

22. The system of claim 19 wherein said engine comprises one of: a controlled-ignition internal combustion engine; a spontaneous-ignition internal combustion diesel engine; an external combustion Stirling engine; and a gas turbine.

23. The system of claim 19 further including a torque converter having an input shaft coupled to an output shaft of said engine, a step-up gear having an input shaft coupled to an output shaft of said torque converter, and said flywheel includes a shaft coupled to an output shaft of said step-up gear through said clutch.

24. The system of claim 1, in which the flywheel is monoblock and axisymmetric.

25. The system of claim 19 wherein the flywheel is monoblock and axisymmetric.

* * * * *